United States Patent [19]

Lauritsen

[11] Patent Number: 5,099,092
[45] Date of Patent: Mar. 24, 1992

[54] POSITION INDICATOR ASSEMBLY
[75] Inventor: Richard L. Lauritsen, Hoffman Estates, Ill.
[73] Assignee: Eaton Corporation, Cleveland, Ohio
[21] Appl. No.: 583,257
[22] Filed: Sep. 17, 1990
[51] Int. Cl.$^5$ .............................................. H01H 3/16
[52] U.S. Cl. ............................. 200/61.91; 200/61.88
[58] Field of Search ................: 200/16 B, 16 E, 61.88, 200/61.89, 61.91

[56] References Cited
U.S. PATENT DOCUMENTS
3,898,401 8/1975 Noba et al. ........................ 200/61.91

Primary Examiner—J. R. Scott
Attorney, Agent, or Firm—R. A. Johnston

[57] ABSTRACT

An indicator providing an electrical indication of the positions of a user movable mechanical selector. The indicator base has a plurality of spring biased contact pins slidably contacting patterned conductive regions on the surface of the selector for completing a circuit through, or between the pins for indicating selector positions. The indicator base cover is telescopically mounted on the base with conductive springs connecting terminals provided in the cover with the pins. One pin has a shorting bar for providing an auxiliary current path. An annular seal about the outer periphery of the telescoping cover provides sealing about external casing structure. The indicator base is adapted for mounting about a common point axis for the movable selector for accuracy of location.

14 Claims, 5 Drawing Sheets

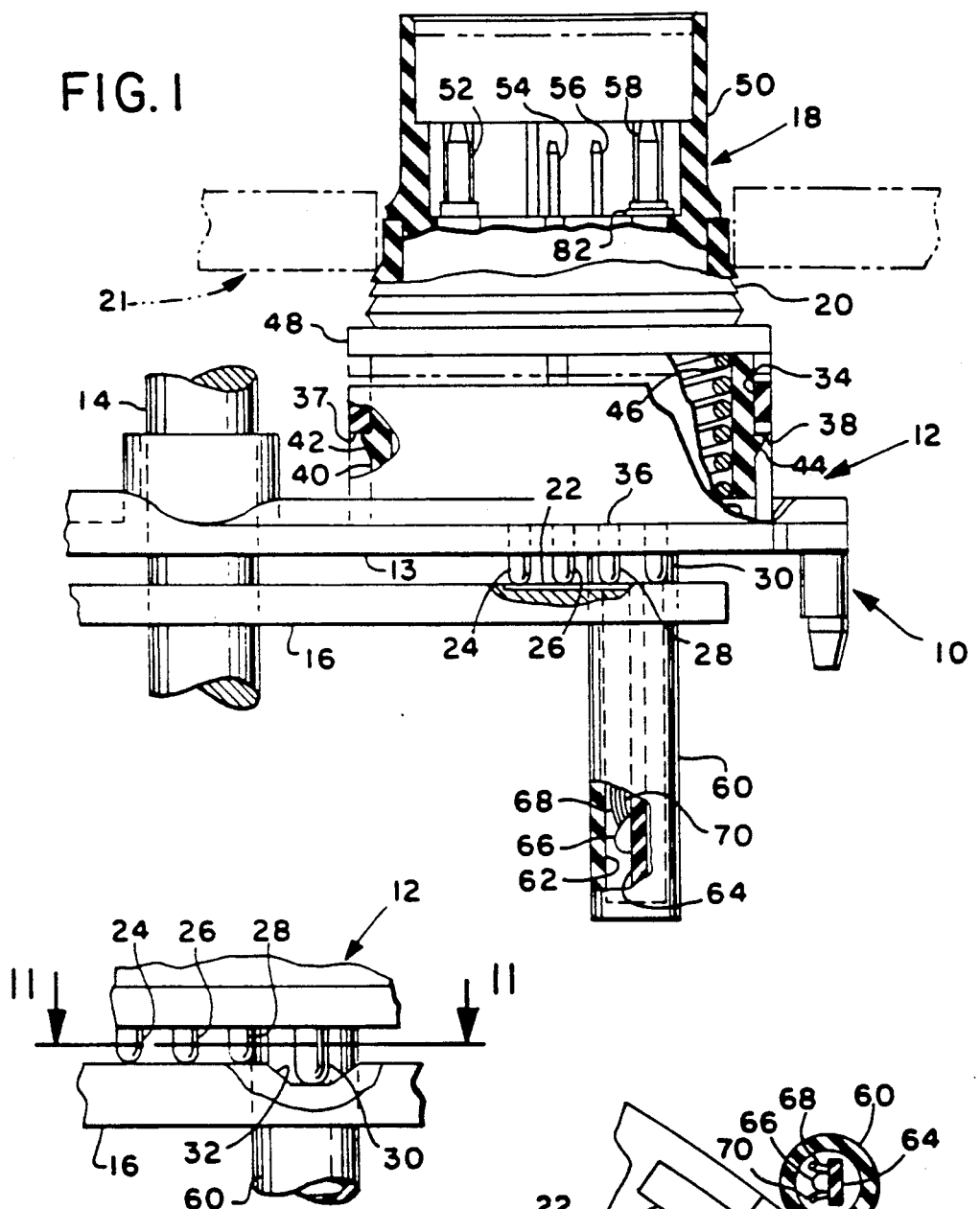
FIG. 1
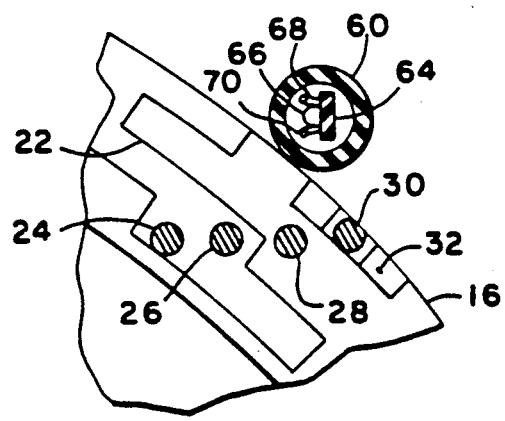
FIG. 10
FIG. 11

POSITION INDICATOR ASSEMBLY

BACKGROUND OF THE INVENTION

The present invention relates to devices for providing an electrical indication of the relative position of a movable member. In particular the invention relates to devices where it is desired to provide the relative position of a selector member movable by a vehicle operator for selecting the desired mode of operation of the vehicle drive transmission. In certain automotive applications, it is desired to provide an electrical signal to an onboard electronic microcomputer, employed for transmission operational control, of the position of the selector member as an indication of the vehicle operator's selection for the drive mode.

Transmission selector position indicators for automotive applications must provide relatively long life and reliable and repeatable operation in an environment of transmission hydraulic fluid, engine oil, and road dirt. In such applications, it is desired to provide the selector position indicator interiorly of the transmission housing or casing and provide an externally accessible electrical connector for the electrical leads to the on-board computer circuitry. Where such a transmission selector position indicator has been mounted through the wall of the transmission casing, problems have been encountered in positioning the actuator portions of the indicator accurately with respect to the movable selector mechanism. Problems have also been encountered in providing accuracy of position indication due to the dimensional tolerances of the location of the position indicator and the dimensional variations of the selector members.

Heretofore, where it has been desired to provide an electrical indication of the relative position of an automotive transmission selector, plural electrical assemblies have been employed, disposed at selected spaced circumferential locations about the pivoted member of the selector mechanism within the transmission casing. Typically, plural plunger-actuated electrical switches would be disposed through the transmission casing with the plungers contacting detent surfaces on the pivoted selector member. Although this arrangement has been used in mass-produced automotive transmissions for passenger cars, problems have been encountered for accurately locating the switch actuation plungers within the transmission casing, with respect to the detent surfaces on the pivoted selector member. The problems of dimensional variation and accuracy of location of the plural switches have made it desirable to find another way or means of providing an accurate electrical indication of the transmission mode selector position.

SUMMARY OF THE INVENTION

The present invention provides a unique and novel solution to the problem of electrically indicating the relative position of a mechanical selector, such as the mode selector for an automotive drive transmission. The indicator assembly of the present invention provides a housing having a plurality of spring-biased electrical contact pins extending therefrom which are adapted for wiping contact with electrically conductive strips providing on the moving selector member. The housing cover is telescopically received thereover and has connector terminals therein which slidingly engage the spring-biased pins to provide electrical contact with the terminals. The cover is adapted to be received in an opening in the transmission casing, and have the electrical terminals extend exteriorly of the transmission wall. One pin of the indicator assembly is adapted to engage a mechanical detent on the movable selector member, whereupon the pin acts as a shorting bar between two electrical contacts to provide an auxiliary mechanical position indication such as, for example, the "REVERSE" drive mode selection. The pair of spaced contacts are preferably formed as flat plates disposed adjacent opposite sides of the pin, and each of the plates has a tower portion rising thereabove and having pin sockets formed integrally therewith to receive mating connector pins in the cover. Optionally, the housing or base may have a metal probe extending therefrom, having a thermistor disposed therein, with the leads thereof attached to insockets provided on a tower within the indicator housing.

User movement of the transmission selector member causes the pins to make electrical contact with the associated strips on the selector member to provide an electrical circuit between two pins when a desired selector position has been reached to thereby provide an electrical indication of the selector position. The device is received over the transmission selector pivot shaft, and registered thereon to thus minimize problems of location and dimensional variation with respect to the electrical conductor strips provided on the selector member.

It is thus an object of the present invention to provide an electrical indication of the Precise position of a user movable mechanical selector member which is low in manufacturing cost yet has accuracy and repeatability over an extended service life such as encountered in automotive drive transmission applications.

BRIEF DESCRIPTION OF THE DRAWINGS

FIG. 1 is an elevation view of the indicator assembly of the present invention;

FIG. 10 is detail of a portion of FIG. 1, with a selector member moved to the mechanical detent position for permitting the internal switch to close; and, FIG. 11 is a portion of a section view taken along section indicating line 11—11 of FIG. 10.

DETAILED DESCRIPTION

Figure 2:
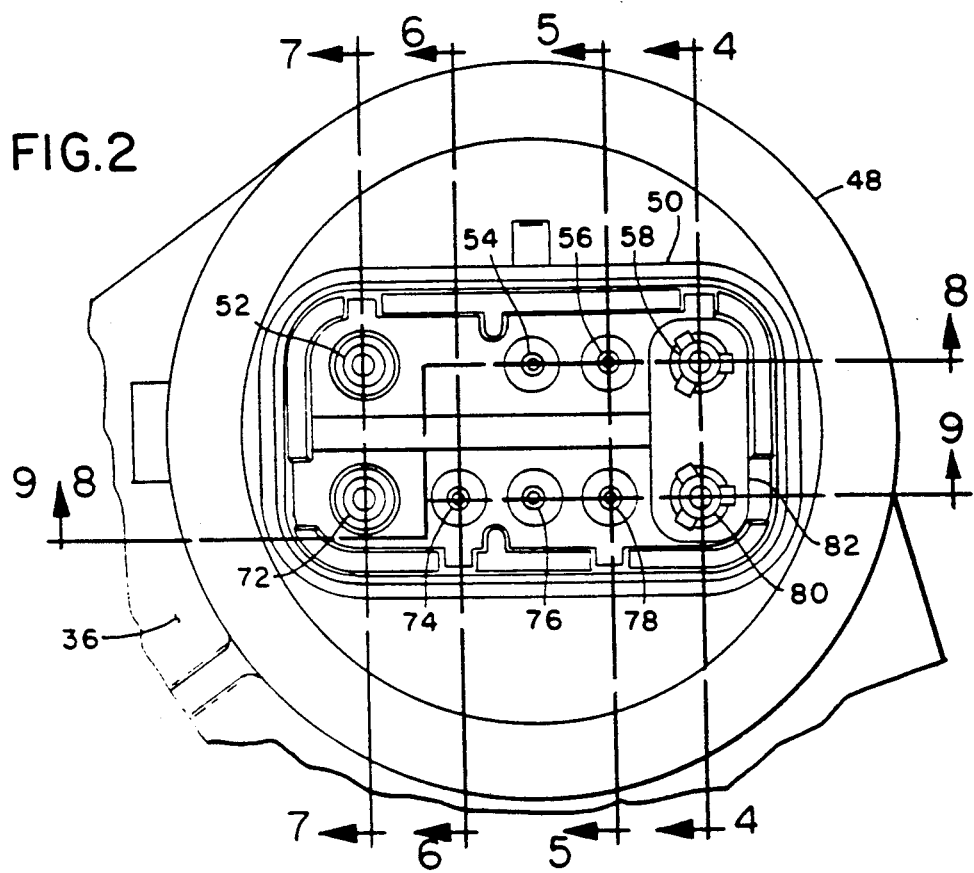
FIG. 2 is a top view of the assembly of FIG. 1, with the left hand portion truncated.

Referring to FIG. 1, the position indicator assembly is indicated generally at 10 as having a base or housing means assembly indicated generally at 12 pivoted about a shaft 14 received therethrough; and, the base means has a generally flat undersurface 13 spaced closely adjacent a movable selector member 16 which is also commonly pivoted for movement about shaft 14.

The base means has a cover assembly indicated generally at 18. The cover assembly 18 has a resilient annular generally tapered seal 20 provided about the periphery thereof, which is adapted for sealing about an aperture provided in base mounting structure such as the wall of an automotive power transmission shown in dashed outline in FIG. 1 and denoted generally by reference numeral 21. It will be understood that shaft 14 is journalled for rotation through the wall of an automotive power transmission casing, with the selector member 16 and the base means 12 disposed interiorly of the transmission 21. It will also be understood that portions of the shaft 14 extend exteriorly of the transmission for mechanical linkage connection thereto (not shown) for selective movement by the vehicle operator. "It will be understood that the base means 12 and cover means or cap member 18 are formed of electrically insulating material."

The pivoted selector member 16 has at least one coded conductive strip 22 provided on the upper face thereof, which is contacted by at least one, and preferably a plurality, of spaced conductor pins 24, 26, and 28, which extend downwardly through apertures provided in the bottom of the base assembly 12, as will hereinafter be described. An additional pin 30 extends downwardly from the base means 12, and is operative upon rotation of the selector member 16 to a desired position, such as the "REVERSE" position, to permit pin 30 to extend further downwardly as shown in FIGS. 10 and 11, by means of a detent notch denoted by reference numeral 32 in the selector member 16.

The base means 12 has a generally annular wall 34 extending upwardly from a deck portion 36, and the wall 34 has diametrically opposed slots 37, 38 formed therein.

The cover means 18 has a downwardly extending cylindrical wall portion 40 which telescopically interengages the inner surface of wall 34 on the base means. Diametrically opposed lugs 42, 44 are formed on wall portion 40 and provide, locking engagement with, respectively, slots 37, 38, to limit the upward or outward telescopic movement of the cover means 18 with respect to the base 12. A spring 46 is provided within the cover assembly with the lower band thereof registered against the deck 36 for biasing the cover assembly upward to a position wherein the lugs 42, 44 register against the upper edge of slots 37, 38.

Cover means 18 has a circular flange 48 which extends radially outwardly over the upward edge of the wall 34 to limit the downward movement of the cover means 18 on the base means 12.

Referring to FIGS. 1 and 2, the cover means 18 has the upper portion 50 thereof formed to a generally rectangular configuration to provide an electrical connector shell having a plurality of connector pins 52, 54, 56, and 58 provided therein in a suitable arrangement for receiving thereover a mating electrical wiring harness connector (not shown). It will be understood that the cover means 18 is shown in the extended condition in solid outline in FIG. 1, and in a telescopically compressed condition in dashed outline in FIG. 1 as installed with seal 20 engaging a wall structure 81 such as a vehicle transmission casing aperture.

If desired, an optional probe portion 60 may be provided on a base means provided downwardly therefrom having the interior thereof hollowed out to form a cavity 62 which has a mounting strip 64 received therein, which strip has mounted thereon a thermistor 66 with electrical leads 68, 70 extending upwardly through the base means an into the interior of the base means enclosed by the cylindrical wall 34. The electrical leads 68, 70 are attached to selected electrical terminals within the base means, as will be hereinafter described in greater detail.

Additional electrical terminal pins 72, 74, 76, 78, and 80 are provided in the upper shell portion 50 of the cover means, with pin 80 interconnected with terminal pin 58 by a tie strap 82 such that pins 58 and 80 are electrically in common, as illustrated in FIG. 2.

Figure 3:
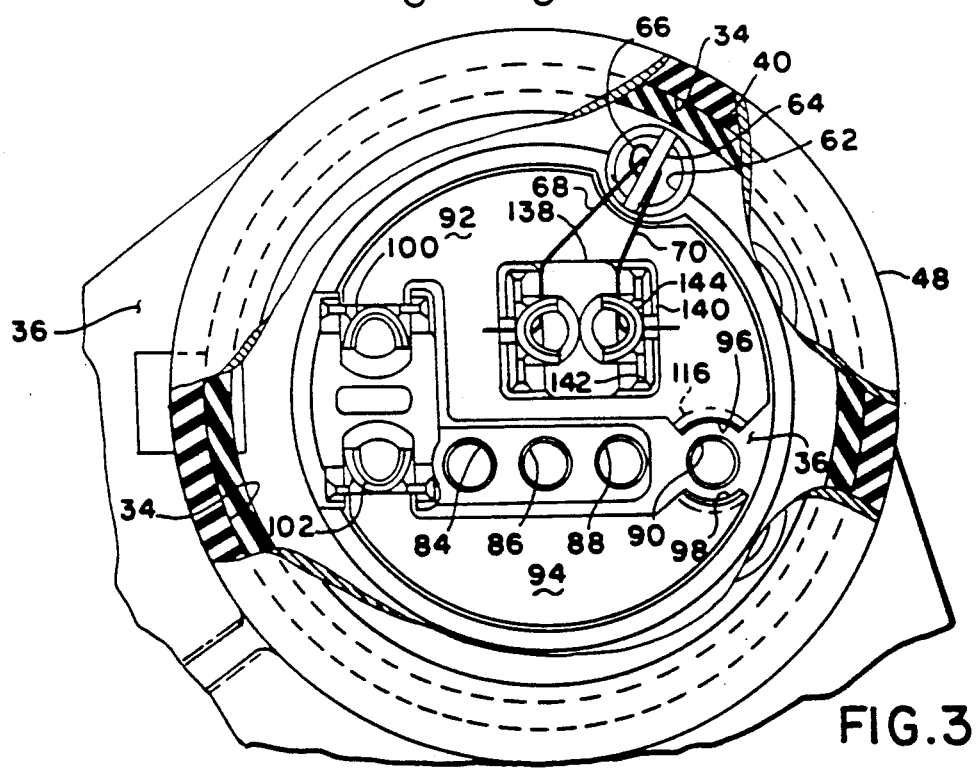
FIG. 3 is a view similar to FIG. 2, with portions of the cover broken away to expose the interior.

Referring to FIGS. 2 and 3, the deck 36 of the base means 12 has formed therethrough a plurality of aligned apertures denoted 84, 86, 88, and 90 which are disposed in aligned relationship as shown in FIG. 3.

Referring to FIGS. 1 and 10, it will be understood that pin 24 is received through aperture 84, pin 26 is received through aperture 86, pin 28 is received through aperture 88, and pin 30 is received through aperture 90.

Referring to FIG. 3, pair of spaced contact plates denoted respectively by reference numerals 92, 94 are provided in the interior of the base means of cylindrical wall 34 and disposed along the deck surface 36 in spaced relationship on opposite sides of aperture 90, with the margins respectively denoted by reference numerals 96, 98, generally configured to conform to, and spaced closely to, opposite sides of the aperture 90. The margins of 96, 98 of the plates 92, 94 are upturned slightly to form accurately raised shaped contact surfaces. The plates 92, 94 each have respectively formed integrally therewith upstanding strip portions having the upper end thereof formed in generally C-shaped configuration, with the edge thereof flared, as denoted by reference numerals 100, 102 respectively.

The C-shaped portions of strips 100, 102 are supported by a tower portion 104, formed integrally with the deck 36 of base means 12. The tower portion has grooves 106 formed therein, with the grooves having respectively each one of the strips 100, 102 having the margins thereof received and supported therein.

Figure 7:
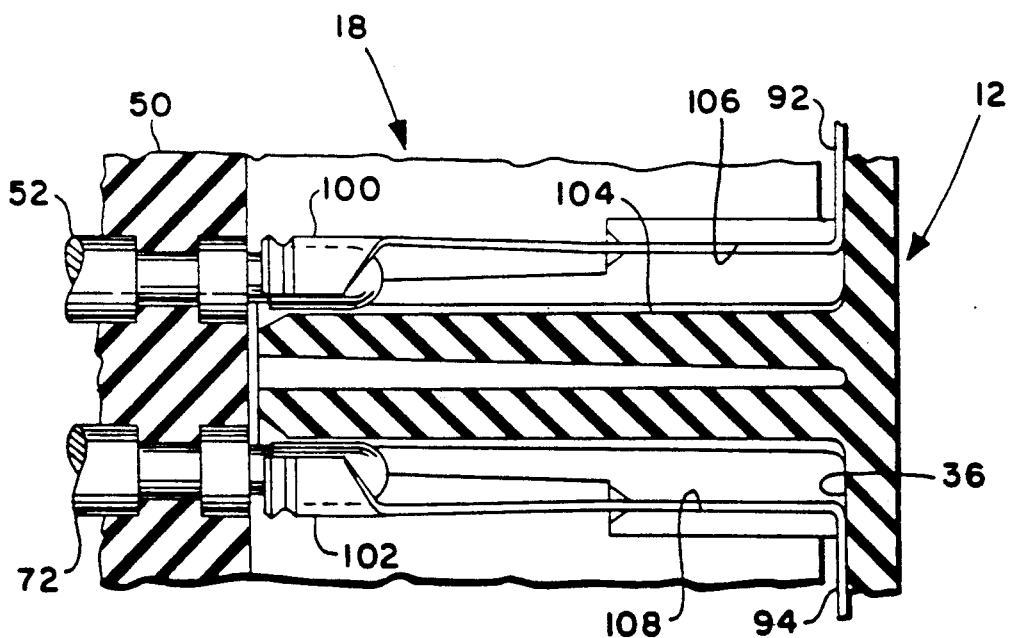
FIG. 7 is a portion of a section view taken along section indicating line 7—7 of FIG. 2.

Referring to FIGS. 1 and 7, the flared and curved portions 100, 102 cooperate with the tower portion 104 to form sockets having terminal pins 52, 72 received respectively therein. It will be understood that pins 52 and 72 retain electrical contact with the strips 100, 102 during any telescopic motion of the cover means 18 with respect to the base means during installation of the assembly into the transmission housing, as the seal 20 makes contact with the aperture provided in the housing.

Figure 4A:
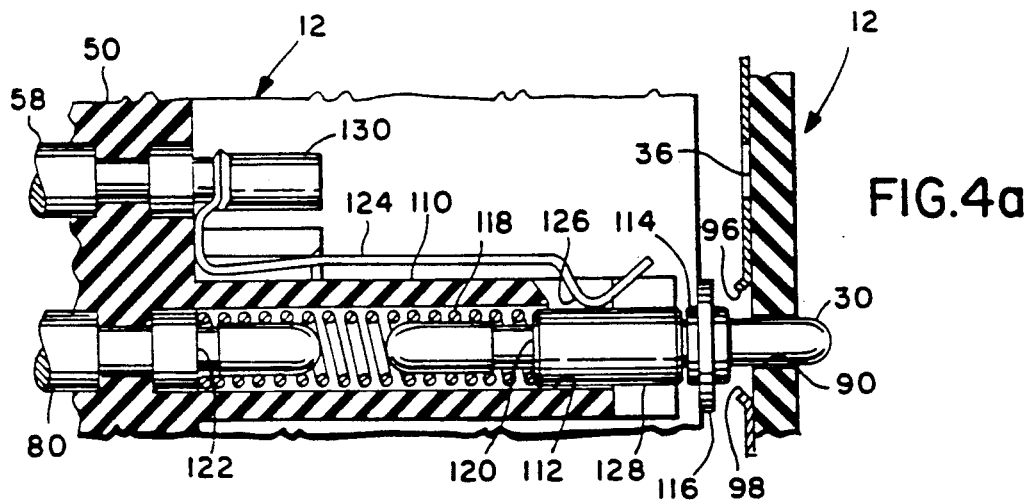
FIG. 4A is a section view taken along section indicating line 4—4 of FIG. 2.
Figure 4B:
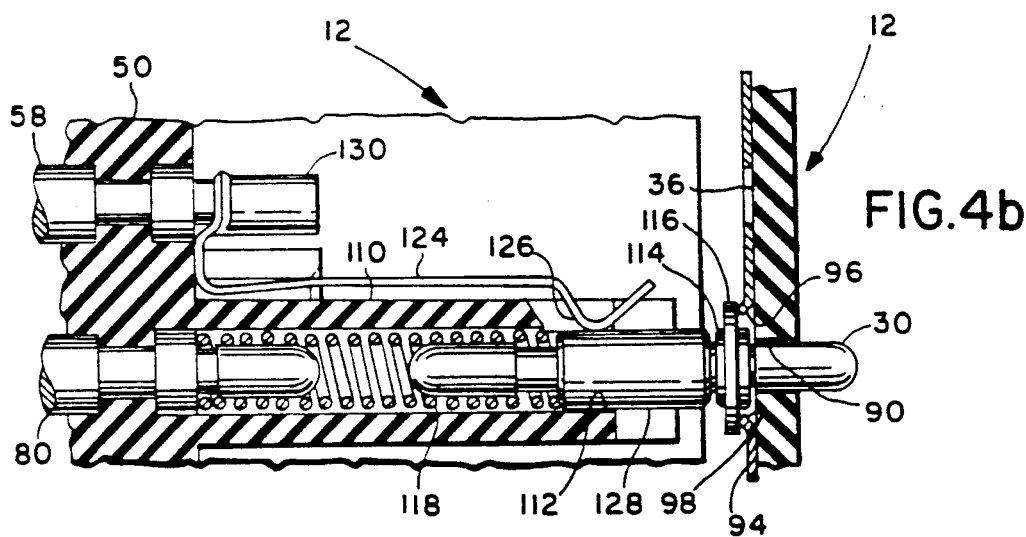
FIG. 4B is a view similar to FIG. 4A, showing the internal pin switch in the closed position.

Referring to FIGS. 4A and 4B, the cover means has a stanchion 110 depending from the undersurface thereof, which stanchion 110 has a bore 112 formed therein aligned with the terminal pin 80 with pin 30 slidably received in the bore 112.

Pin 30, as described above, is formed of suitably plated, electrically conducted material, and has an insulating ring 114 received thereover, which has a shorting means in the form of a plated, conductive washer 116, received thereover and electrically isolated from pin 30. The washer 116 has the outer periphery thereof sized to a diameter greater than the curved or arcuate contacts 96, 98 on plates 92, 94 as will be apparent with reference to FIGS. 4A and 4B, and as shown in dashed outline in FIG. 3. The pin 30 is biased in a rightward direction with respect to FIGS. 4A and 4B by a spring 118 having one end thereof received over a reduced diameter portion of pin 30 thereover and registered against a shoulder 120 provided on the pin 30, with the opposite end of the spring 118 registered against a shoulder 122 provided on terminal pin 80. In the presently preferred practice, the spring 118 is formed of a highly conductive material, such as an alloy of copper, hardened to spring temper and tin plated. The spring 118 thus provides an electrical current path between pin 30 and terminal connector pin 80.

Referring to FIGS. 4A and 4B, an auxiliary contact strip 124 is disposed along stanchion 110, and has the right hand end thereof configured to form a wiper 126 for making wiping contact with the larger diameter 128 of pin 30. The opposite end of the strip 124 has an integral socket 130 formed thereon, and received over the terminal pin 58, thereby providing a parallel electrical current path, or shunt, for spring 118 for current flowing through pin 30. In the presently preferred practice, the pin 30 thus not only makes a circuit through the end thereof extending through the base means 12, but also provides for making a separate circuit through plates 92, 94, and pins 52, 72 by shorting washer 116. In the presently preferred practice, pin 30 is operative to extend to the position shown in FIG. 4B, only when notch 32 is aligned with the pin 30 as shown in FIGS. 10 and 11; and, in an automotive transmission selector application of the present invention, this is permitted to occur only when the vehicle operator moves the selector to the position for "REVERSE" operational mode of the transmission. Thus, pin 30 can provide for closing a normally open circuit across pins 52, 72; and, can separately provide for breaking a heavy current flow of a normally closed circuit having current flowing through pins 58, 80, and pin 30.

Referring to FIGS. 1, 5, 10, and 11, the stanchion 110 which depends from the undersurface of the receptacle shell 50 has a second bore 131 formed therein, which has slidably received therein a large diameter portion 132 of pin 28 which portion 132 has a shoulder 134 formed thereon, with one end of a spring 136 registered thereagainst, with the opposite end of the spring 136 registered against a shoulder 138 provided on terminal connector pin 78. Spring 136 thus urges pin 28 rightwardly or outwardly with respect to the aperture 88 formed in the base means.

Figure 5:
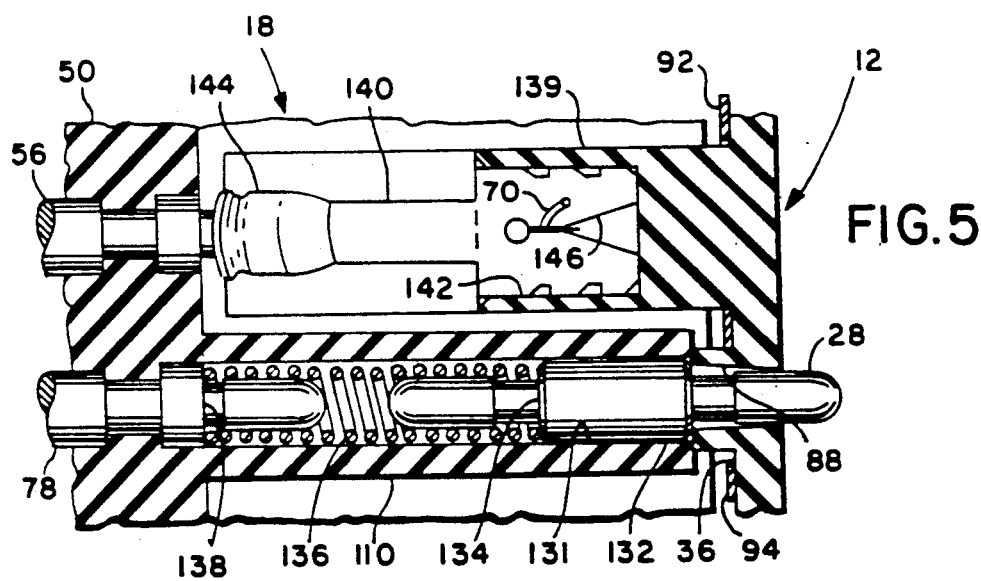
FIG. 5 is a portion of a section view taken along section indicating line 5—5 of FIG. 2.

The deck surface 36 of base means 12 has a second tower 139 formed integrally therewith, and extending upwardly therefrom or to the left with reference to FIG. 5, which has a discrete contact strip 140 provided thereon, and retained by barbed portions thereof engaging the walls of a mortise 142 provided in tower 139. The terminal strip 140 has the upward or left end 144 thereof with reference to FIG. 5, curved and flared to provide a pin-receiving socket. The tower and socket forming portion 144 of strip 140 are also visible in the top view in FIG. 3, and in FIG. 8.

Figure 8:
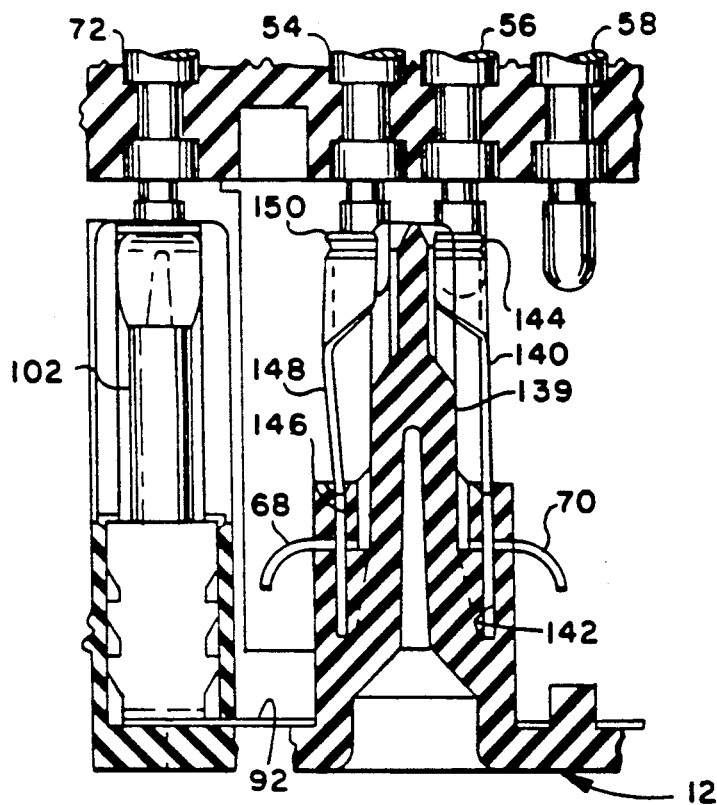
FIG. 8 is a portion of a section view taken along section indication line 8—8 of FIG. 2.
Figure 9:
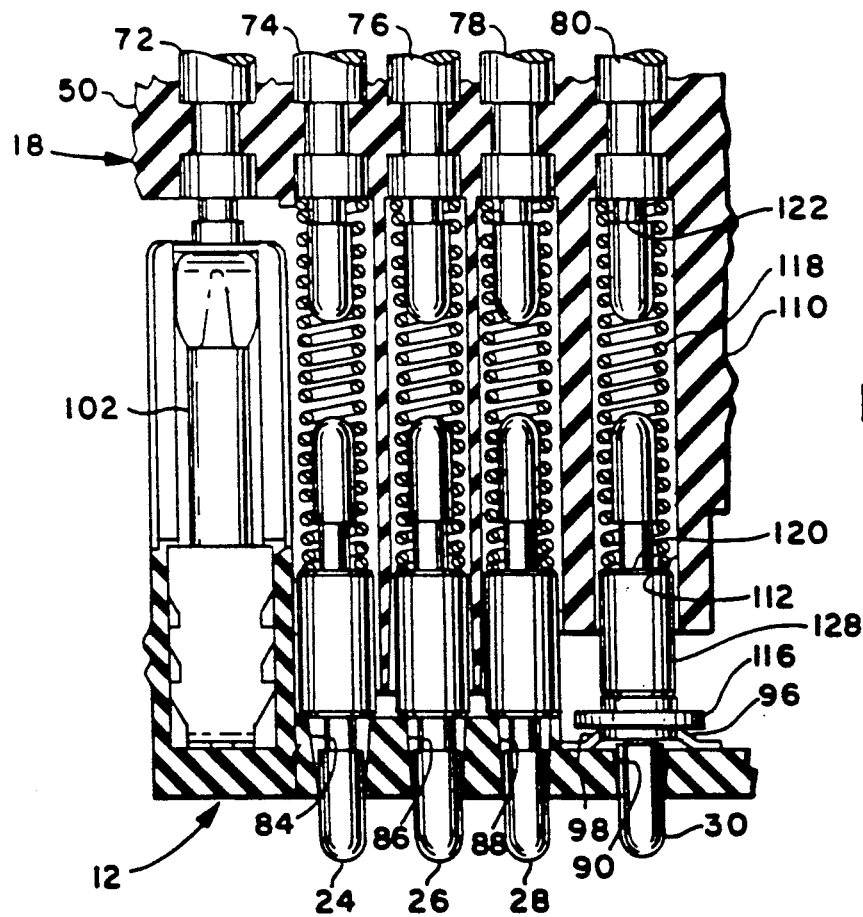
FIG. 9 is a portion of a section view taken along section indicating line 9—9 of FIG. 2.

Referring to FIG. 8, tower 139 has a mortise 146 formed on the opposite side thereof from mortise 142, with a second terminal strip 148 having barbed edges provided thereon received in the mortise 146. The upper end of terminal strip 148 is also curved and flared to provide a pin receiving socket portion 150. The socket forming portion 150 of terminal strip 148 has received therein in sliding engagement the lower end of terminal pin 54 for making electrical contact therewith. The thermistor lead 68 is also received in a slot in terminal strip 128 in a manner similar to the way lead 70 is received in a slot in strip 140. The thermistor is thus connected between electrical terminal pins 54 and 56.

Figure 6:
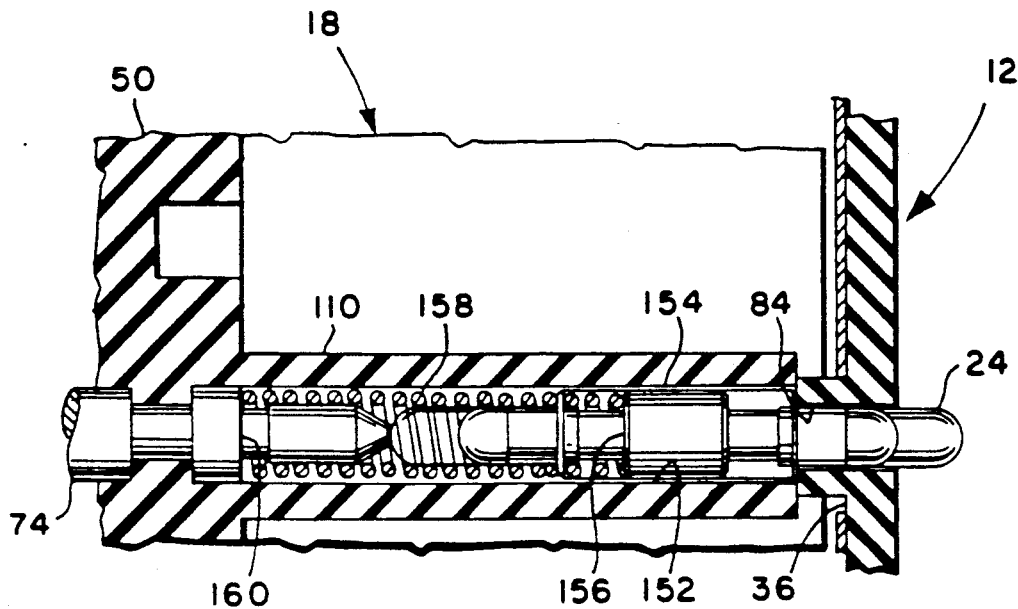
FIG. 6 is a portion of a section view taken along section indicating line 6—6 of FIG. 2.

Referring to FIG. 6, depending stanchion 110 has a fourth bore 152 provided therein which has slidably received therein a large diameter portion 154 of pin 24. Pin 24 has a shoulder 156 provided thereon, having one end of a spring 158 registered thereagainst, with the other end of the spring 158 registered against a shoulder 160 provided on terminal connector pin 74, with pin 24 slidably received in the aperture 84 provided in the base means 12.

The unique and novel structure of the present indicator provides for a plurality of spring loaded pin contacts to engage discrete conductive surface portions of a movable selector member for providing electrical circuits therebetween and an electrical indication of the position of the movable selector member. The housing of the present indicator has a telescopically sliding cover with electrical terminal pins therethrough which slidingly engage sockets formed in stationary terminals provided in the base for certain pins, and provide electrical contact through conductive springs which bias the pin contacts against the movable member when the indicator is installed in proximity to the movable selector member. The integral assembly of the present indicator provides for one of the pin contacts to engage a detent surface on the movable selector member for permitting the pin to close a shorting bar between spaced contacts to provide closing a separate normally open circuit for an auxiliary function as, for example, back up lights for reverse mode operation of a vehicle drive train. The housing of the present invention has a flexible seal mounted therearound for telescopically engaging the wall of a housing in which the indicator is mounted as, for example, an automotive transmission casing to prevent loss of transmission fluid therefrom. The indicator of the present invention is adapted for coaxial mounting about the pivot shaft of the selector member to minimize dislocation of the wiper pins with respect to the selector member conductive strips.

One pin contact of the indicator of the present invention has a shunting wiper strip for providing a parallel current path from the pin around the conductive bias spring.

Although the present invention has herein above been described with respect to the illustrated embodiments, it will be understood that it is capable of modification and variation, and is therefore intended as limited only by the following claims.

I claim:

1. A switch assembly comprising:
   (a) base means formed of electrically insulating material defining a cavity and having a plurality of apertures formed therein communicating with said cavity with each of said apertures having a conducting member received for sliding movement therein and extending downwardly therefrom in generally spaced parallel arrangement;
   (b) bias means formed of electrically conductive material and operative to urge each of said conducting members outwardly of said cavity;
   (c) a plurality of electrical connector terminals disposed within said cavity with each of said terminals disposed for electrical connection with one of said conducting members;

(d) a plurality of spaced electrical conductors disposed in said cavity, each conductor having formed integrally therewith a tower forming an electrical connector terminal adapted for connection thereto; and (e) a pin slidably received in said base means and having first portions thereof extending into said cavity and second portions extending through said base means and exteriorly thereof; said portions including surfaces operative to complete a circuit between said spaced electrical conductors upon sliding movement of said pin in a direction outwardly of said base means.

2. The switch assembly defined in claim 1, wherein said bias means each comprise a spring formed of a beryllium copper alloy.

3. The switch assembly defined in claim 1, wherein said base means includes a cap member received over said cavity, said cap member having a plurality of electrical terminals therethrough, each electrical terminal making electrical contact with one of said tower terminals, said cap member retained in telescoping engagement over said cavity.

4. The switch assembly defined in claim 1, wherein said base means includes a cap member received over said cavity in telescoping arrangement, said cap member having a plurality of external electrical connector, terminals disposed within said cavity, each electrical terminal disposed for electrical connection with one of said conducting members.

5. An electrical position indicator assembly adapted for detecting the positions of a member movable relative thereto, said indicator assembly comprising:

(a) housing means defining cavity with a plurality of spaced apertures disposed therein communicating with said cavity through the wall thereof;

(b) at least one discrete electrically conductive surface portion disposed on said movable member;

(c) electrically conductive pin means received in each of said apertures for sliding movement therein, each of said pin means having portions thereof extending exteriorly of said base means;

(d) means biasing each of said pin means in a direction outwardly of said cavity for contact with said movable member, said biasing means formed of material of relatively high electrical conductivity;

(e) stationary connecting terminal means contacting each of said pin biasing means and having portions thereof extending through the wall of said cavity and exteriorly thereof and for electrical connection; and (f) a pair of electrical contact members disposed in said cavity with certain portions of each contact member spaced closely adjacent one of said pin means; said one pin means having shorting means; said one pin means having shorting means carried thereon and movable therewith and operable upon said one pin means experiencing sliding movement in said aperture associated therewith, to cause said shorting means to make a circuit between said pair of electrical contact members.

6. The indicator assembly defined in claim 5, further comprising shunt means slidably contacting said one pin means and connected to the said stationary electrical terminal means associated with said one pin means, said shunt means providing a parallel current path with the said bias means associated with said one pin means for current flowing through said pin means.

7. The indicator assembly defined in claim 1, wherein said means shorting means comprises a washer of electrically conductive material insulated from said exteriorly extending portion of said one pin means.

8. The indicator assembly defined in claim 5, wherein said pair of electrical contact members each has a connector tower portion formed integrally therewith and defining at least a portion of a pin socket, said one tower portion extending across said cavity and receiving therein a stationary connector pin extending exteriorly from the wall of said cavity opposite said pair of electrical contacts.

9. A position indicator assembly for indicating the positions of a member movable relative thereto, said indicator assembly comprising:

(a) base means defining an open cavity having a plurality of spaced apertures formed through a common wall of said cavity;

(b) cover means disposed over said cavity opening and closing same in sliding engagement with said base means, and including means biasing said cover means outwardly with respect to said cavity;

(c) at least one pin means each formed of electrically conductive material and slidably mounted on said cover means, each of said pin means having portions thereof slidably received in one of said apertures in said base means cavity wall and extending exteriorly of said cavity for external electrical connection;

(d) means retaining said cover means on said base means;

(e) electrically conductive bias means operative to resiliently bias each of said pin means in a direction causing said portions slidably received in said base apertures to extend exteriorly of said base means; and, (f) at least one connector terminal means extending through said cover means and in electrical contact with said electrically conductive bias means associated with each of said pin means, wherein said pin means provide for electrical contact with conductive surfaces on the movable member.

10. The indicator assembly defined in claim 9, further comprising:

(a) a pair of spaced electrical contact members disposed closely adjacent one of said apertures, each of said contact member having tower portions thereof extending across said cavity and electrically connecting with one of said connector terminal means on said cover means;

(b) shorting bar means carried by one of said pin means and electrically isolated therefrom, said shorting bar means upon experiencing a predetermined movement with said one pin means, operative to make an electrical circuit across said pair of spaced contact members.

11. The indicator assembly defined in claim 9, wherein said connector terminal means associated with one of said at least one pin means further comprises shunt means slidably contacting said one pin means for providing an additional parallel path for current flowing between said one pin means and said connector terminal means.

12. The indicator assembly defined in claim 9, further comprising:

(a) a probe portion, extending from said base means, said probe defining a hollow communicating with said base means cavity;
(b) a thermistor disposed in said probe hollow;
(c) a tower portion formed in said base means cavity and having a pair of electrical connectors disposed thereon; and,
(d) lead means connecting said thermistor to said pair of connectors, wherein each of said pair of connectors makes electrical connection with one of said electrical connectors on said cover means.

13. The indicator assembly defined in claim 9, wherein said bias means include a spring formed of beryllium copper alloy.

14. The indicator assembly defined in claim 9, wherein said pin means includes a tin-plated copper member.

* * * * *

UNITED STATES PATENT AND TRADEMARK OFFICE
CERTIFICATE OF CORRECTION

PATENT NO.   : 5,099,092
DATED        : March 24, 1992
INVENTOR(S)  : R. L. Lauritsen It is certified that error appears in the above-identified patent and that said Letters Patent is hereby corrected as shown below:

Col. 7, line 57, after "means;" delete "said one pin means having shorting means"

Signed and Sealed this

Thirteenth Day of July, 1993

Attest:

MICHAEL K. KIRK

Attesting Officer

Acting Commissioner of Patents and Trademarks